Jan. 26, 1954 W. McK. MARTIN 2,667,424
APPARATUS AND METHOD FOR FILLING PRODUCTS IN CONTAINERS
Filed July 11, 1949 9 Sheets-Sheet 1

INVENTOR.
WILLIAM McK. MARTIN
BY Charles M. Fryer
ATTORNEY

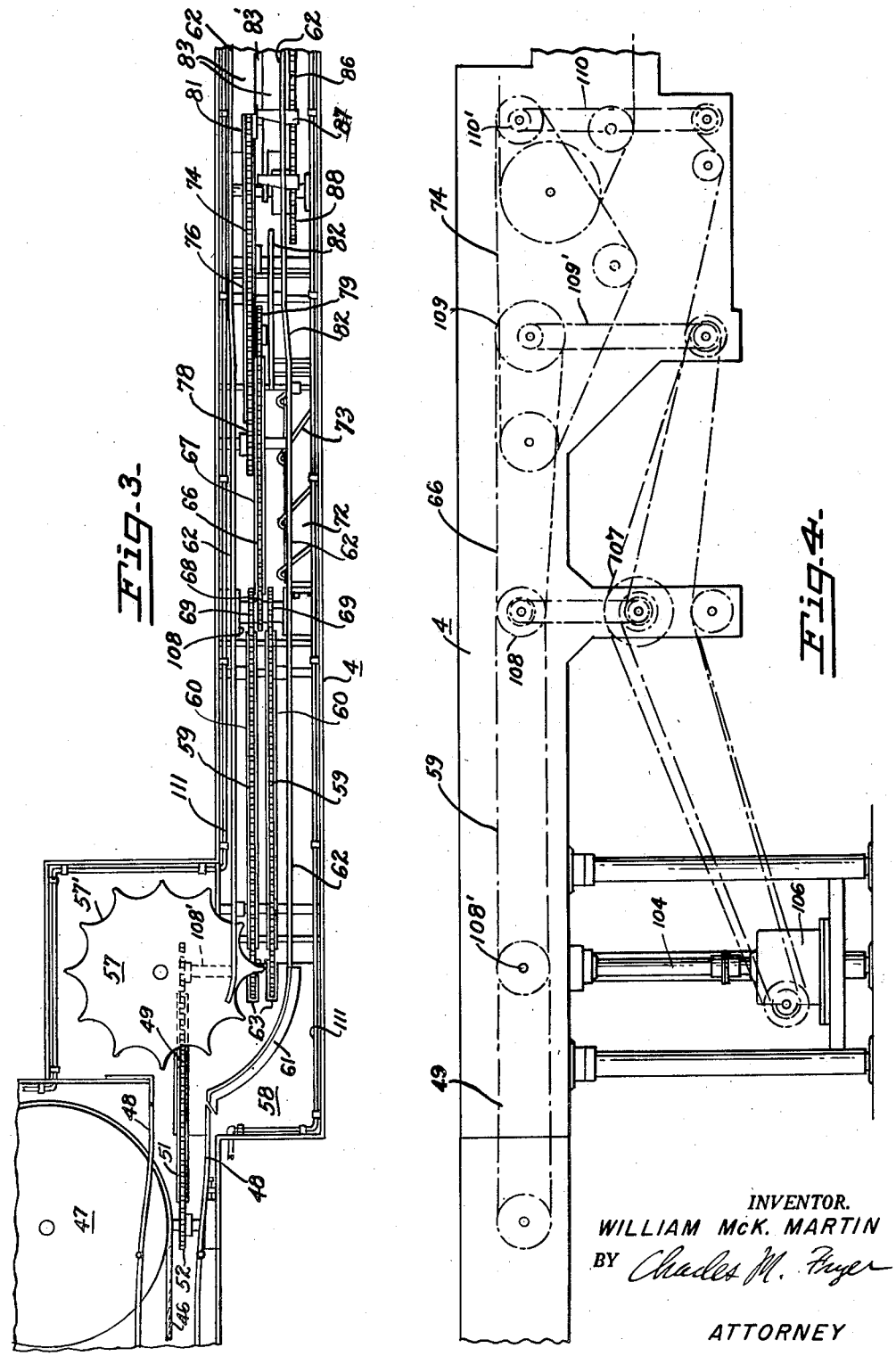

Jan. 26, 1954  W. McK. MARTIN  2,667,424
APPARATUS AND METHOD FOR FILLING PRODUCTS IN CONTAINERS
Filed July 11, 1949  9 Sheets-Sheet 4

INVENTOR.
WILLIAM McK. MARTIN
BY Charles M. Fryer
ATTORNEY

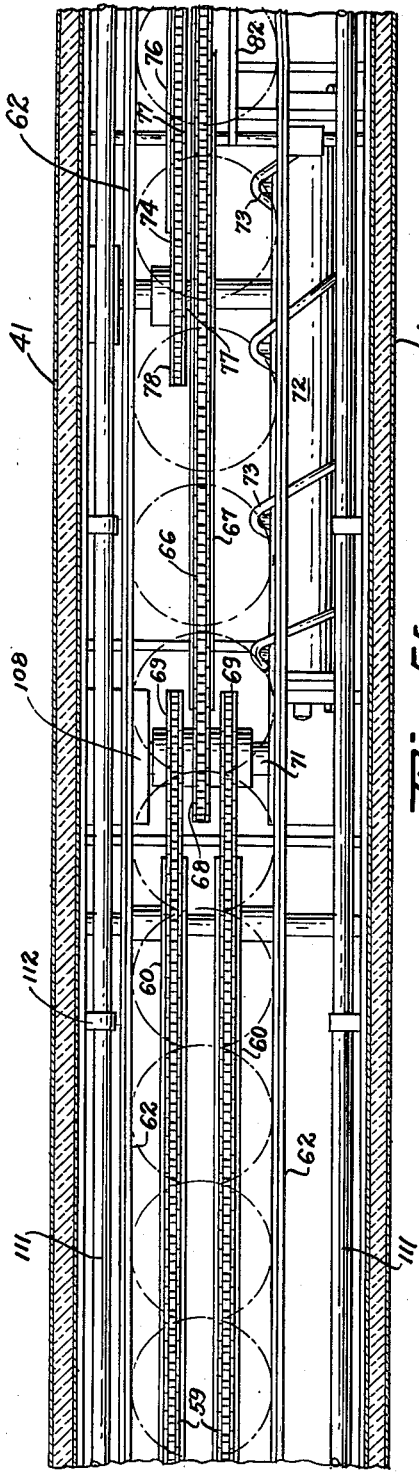

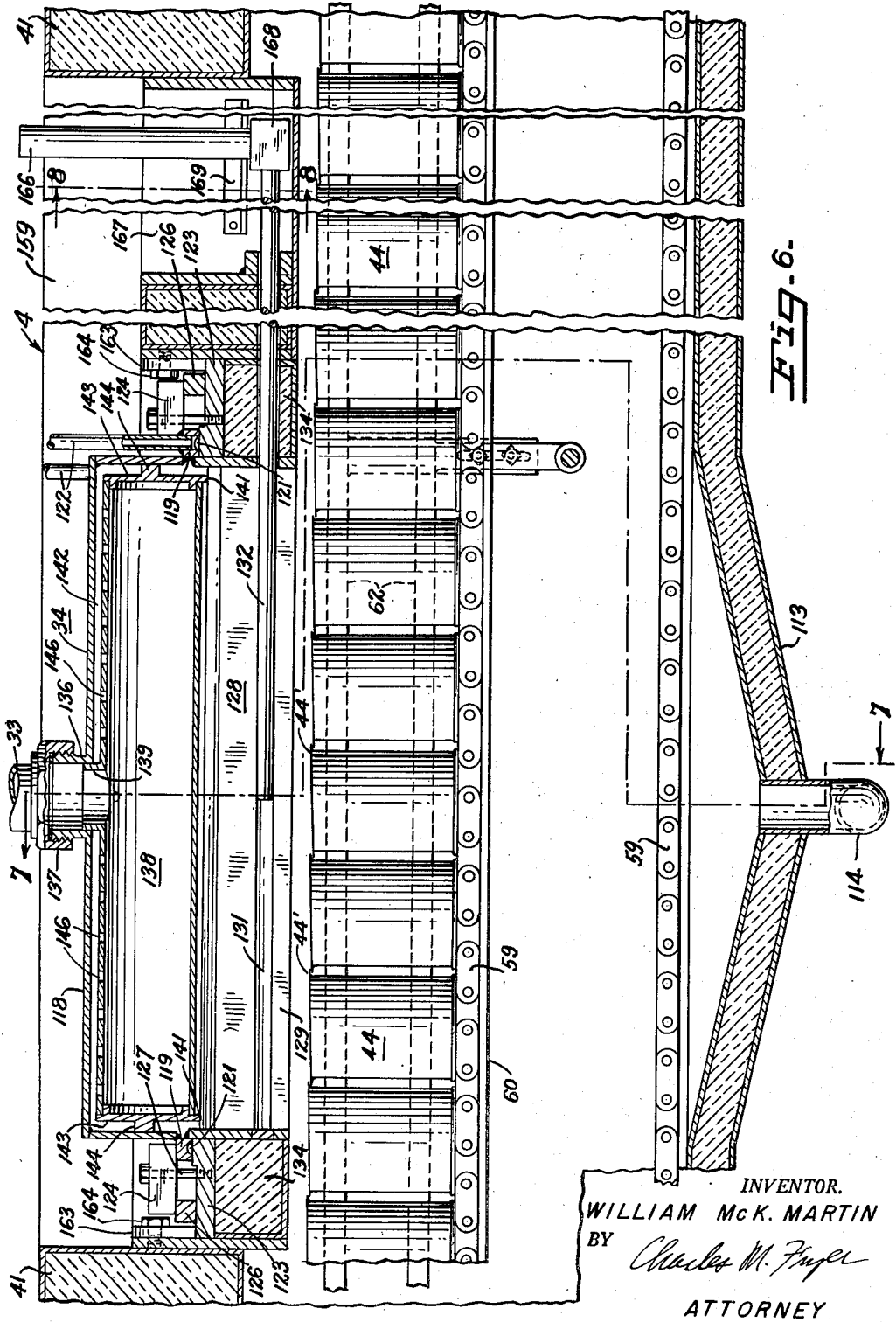

Jan. 26, 1954     W. McK. MARTIN     2,667,424
APPARATUS AND METHOD FOR FILLING PRODUCTS IN CONTAINERS
Filed July 11, 1949     9 Sheets-Sheet 7
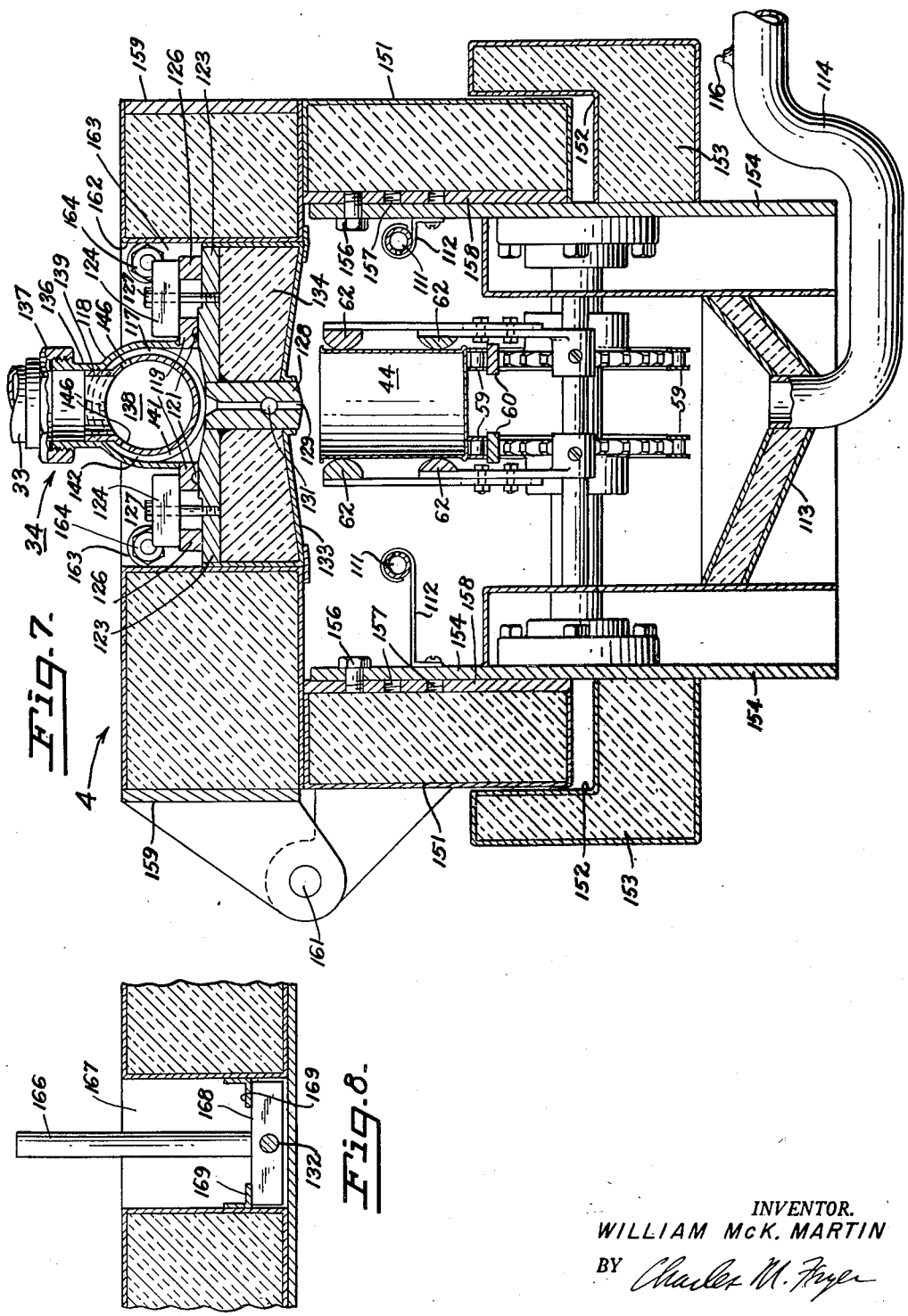
INVENTOR.
WILLIAM McK. MARTIN
BY
ATTORNEY

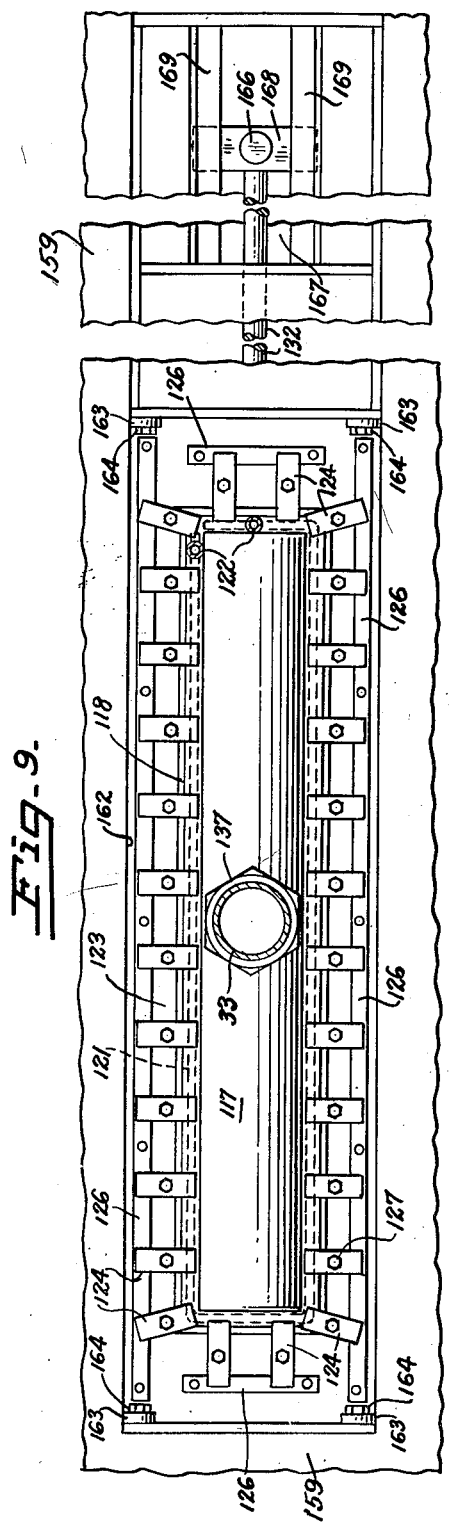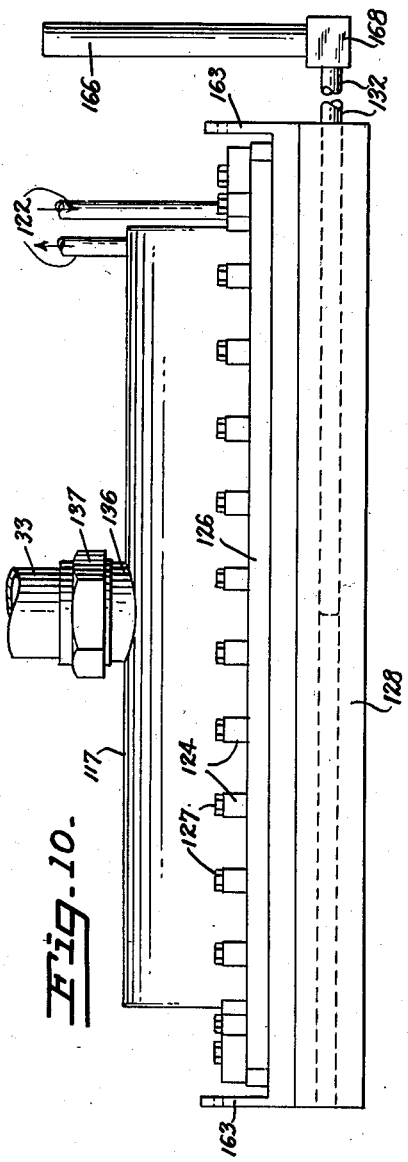

Jan. 26, 1954     W. McK. MARTIN     2,667,424
APPARATUS AND METHOD FOR FILLING PRODUCTS IN CONTAINERS
Filed July 11, 1949     9 Sheets-Sheet 9
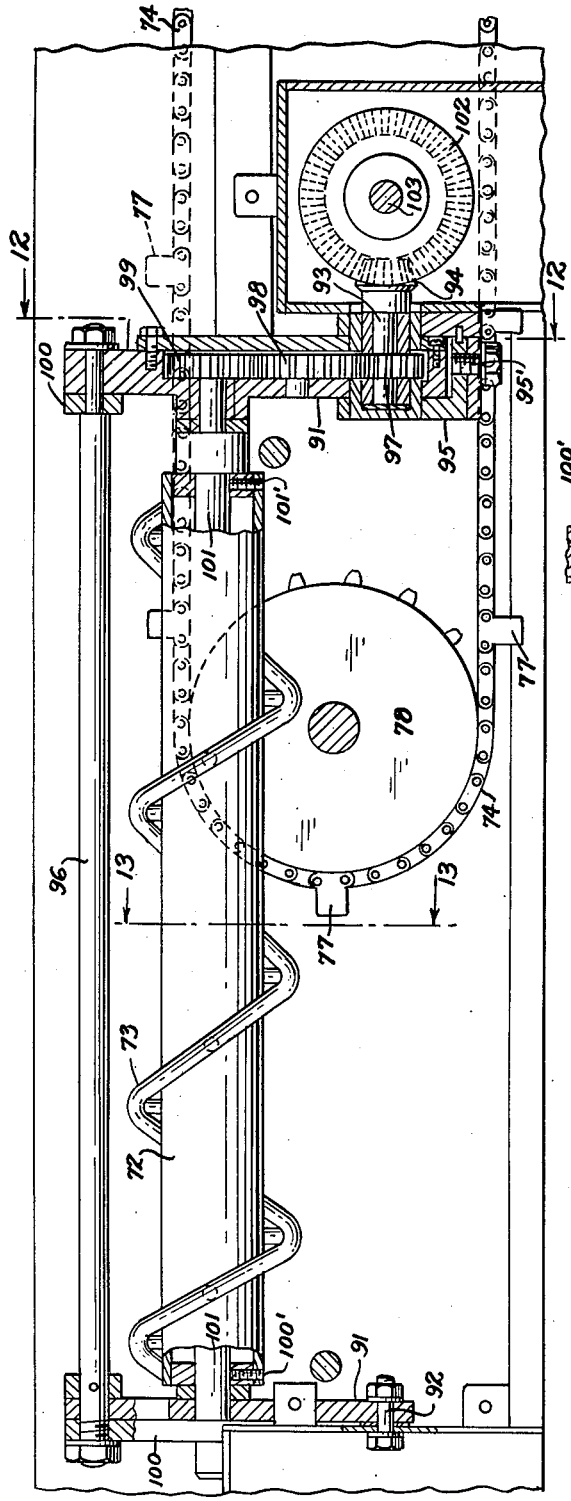
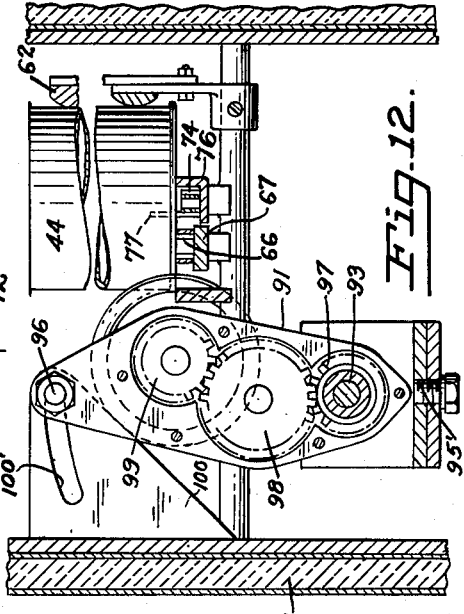
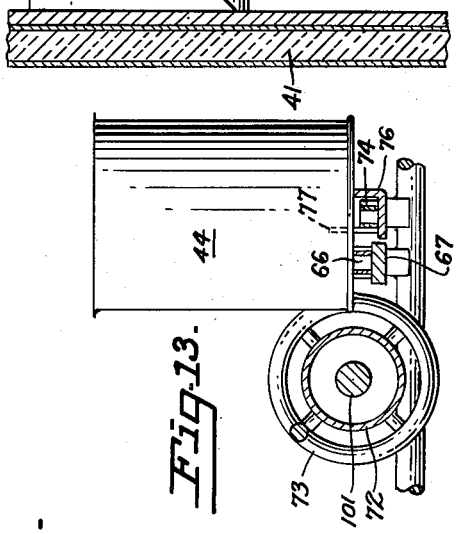
INVENTOR.
WILLIAM McK. MARTIN
BY
ATTORNEY

UNITED STATES PATENT OFFICE 2,667,424

APPARATUS AND METHOD FOR FILLING PRODUCTS IN CONTAINERS

William McK. Martin, San Mateo, Calif., assignor to James Dole Engineering Co., a corporation of Nevada Application July 11, 1949, Serial No. 104,074

5 Claims. (Cl. 99—182)

This invention relates to the continuous filling of a product in containers, and more particularly to an improved method and apparatus for effecting filling of a sterile food product in the type of aseptic processing system disclosed in applicant's Patent No. 2,549,266, dated April 17, 1951, wherein all operations of sterilization of the containers and their covers, filling the containers with a sterile product and sealing the product filled containers are conducted under sterile or aseptic conditions in a unitary self-contained apparatus at atmospheric pressure, by steam superheated by auxiliary heating means to a sterilizing temperature above 212° F.; the auxiliary heating means providing a superheater which imparts heat energy to the steam in addition to the energy imparted thereto by heat of vaporization as a result of mere generation of the steam.

Summarizing this invention, it relates primarily to the filling section or zone of the described type of apparatus, which comprises an enclosure providing a passageway unsealed to the atmosphere. Associated with the passageway is a special type of continuous filler which feeds a continuous stream of the sterile product into containers which are continuously conveyed in a line, which may be arcuate but is preferably straight, along or past the filler at such speed as to cause each container to be substantially completely filled as it passes by the filler; the containers being conveyed with a substantially continuous or uninterrupted motion, so that spillage of the contents is obviated which would otherwise result if the containers were held stationary under the filler during the filling operation, and consequently have to be moved after each filling operation with the result that the entire line of containers would have to be moved with an interrupted motion.

Means associated with the container conveying means positions the containers in a predetermined relationship adapted for proper filling thereof. In the embodiment of the invention illustrated in the drawings, can containers of the conventional type having outwardly extending flanges at their mouths are shown; and timing means positions the cans in substantially contacting relationship with their flanges overlapping. Means is also associated with the conveying means to space the containers apart after they are filled, to any predetermined spaced relationship adapted for feeding thereof with proper spacing to any conventional type of can closing machine wherein the can covers are clinched or sealed over the container flanges.

To maintain sterile conditions in the filling section enclosure, it is subjected to steam which has been previously superheated by auxiliary heating means to a sterilizing temperature materially above 212° F. at substantially atmospheric pressure for the purpose of sterilizing the containers and their covers. In other words, the steam is not saturated steam but is dry steam that has additional or outside heat imparted thereto besides that resulting merely from the heat of steam generation at any given pressure. Superheating of the steam is necessary because at substantially atmospheric pressure, the steam could otherwise not be at a sufficiently high temperature above 212° F. to sterilize the containers and the container covers within a time period practical for commercial operations.

The steam also serves the function of providing an air free atmosphere in the filling section which is important in preventing entrapment of air in the product as it is being filled. For this purpose, any other inert atmosphere such as nitrogen, could be employed if a product, such as oils, to be filled, does not require sterile filling conditions; and in this connection, the filling apparatus can be employed per se with advantageous results for the filling of such type of products that do not require sterile filling conditions. The sterile conditions are required for food products such as purees, various milk products, soups, baby foods, etc.

The filler unit itself is of special design adapted for the continuous filling of containers of various types which are moved therepast with a substantially uninterrupted motion. It is provided with an elongated discharge spout having a discharge opening longer than the mouth of each container whereby the discharge opening can always span the mouths of a plurality of containers as they are moved past the filler. In the case of can containers having the usual flanges at their open mouths, the product can be introduced into the containers without spillage when the containers are moved past the filler with their flanges overlapped and at such speed relative thereto as to cause each container to be substantially completely filled in its travel past the filler. In this connection, means, which may conveniently be a pump, is provided for feeding the product to the filler at any predetermined fixed quantity or volume per unit of time; so that the containers will be always filled to the same amount, the pumping capacity being adjustable in accordance with the container size to control the quantity which may be supplied per unit of time.

Liquids of various types have varying viscosities which affect the evenness of the filling. To insure that the containers will be filled evenly without piling up of the product along the sides of the containers or in the center, the filler spout discharge opening is provided with a control valve to adjust the cross sectional area thereof; so that for any fixed given quantity of product flow, the velocity of the flow can be altered in accordance with the viscosity of the product to provide for even filling of the container.

From the preceding summary, it is seen that this invention has as its objects, among others, the provision of an improved and economical apparatus and method for the continuous filling of containers at substantially atmospheric conditions and which are maintained sterile by steam superheated to a temperature above 212° F. at atmospheric pressure, thus eliminating expensive pressurized equipment and valve means heretofore required to maintain steam pressure in order that the steam could be at a sufficiently high sterilizing temperature above 212° F.; an improved and economical filling mechanism and process per se adapted for the continuous filling of liquid products not requiring sterilizing, or sterile containers and covers; and an improved apparatus and process whereby the continuous filling is conducted in an air free atmosphere thus obviating the entrapment of air in the product. Other objects and further particulars of the invention will become apparent from the following detailed description thereof in which reference to the drawings is made. In such drawings:

Fig. 1 is a schematic view of the entire system in which the filling apparatus and the process of this invention are particularly applicable;

Fig. 3 is a fragmentary plan view of the filling section of the apparatus, with the cover structure removed, and associated parts, illustrating the filling zone and timing mechanism associated therewith for positioning the containers in proper predetermined relationship; insulation and other parts of the structure being omitted from the view to illustrate more clearly the construction;

Fig. 4 is a side elevation of the mechanism illustrated in Fig. 3, schematically depicting the drive arrangement for the various parts;

Figs. 5a, 5b and 5c are enlarged horizontal sectional elevations of the portion of the mechanism illustrated in Fig. 3; the respective figures when read together in the order indicated extending substantially the length of the structure shown in Fig. 3. In Figs. 5a, 5b and 5c, insulation and steam piping are shown;

Fig. 6 is an enlarged longitudinal vertical sectional view through the filler portion of the apparatus, illustrating particularly the filler mechanism and the manner in which open mouth conventional can type containers are conveyed past the filler;

Fig. 7 is a transverse vertical section taken in planes indicated by the line 7—7 in Fig. 6;

Fig. 8 is a fragmentary section taken in a plane indicated by line 8—8 in Fig. 6;

Fig. 9 is a top plan view of the filler illustrating its mounting;

Fig. 10 is a side elevational view of the filler;

Fig. 11 is a fragmentary sectional elevation of the mechanism for spacing the containers apart in a predetermined relationship adapted for feeding thereof to a can closing machine, not shown;

Fig. 12 is a section taken in planes indicated in the line 12—12 in Fig. 11;

Fig. 13 is a section taken in a plane indicated by the line 13—13 in Fig. 11.

Figure 2C:
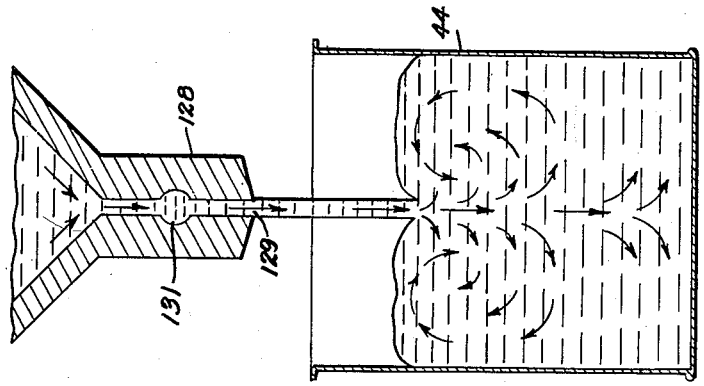
Figs. 2a, 2b and 2c are, respectively, schematic views illustrating the effect of velocity of discharge of the product from the filler on evenness of the filling operation.

As is described in the aforesaid Patent No. 2,549,216, the apparatus of this invention comprises a container sterilizer 3 (Fig. 1) which provides a container sterilizer zone or section, and which communicates with a product filling zone or section 4 in turn communicating with a container sealing section or zone 6 containing any suitable conventional container closing or capping machine. The container closing or sealing zone 6 communicates also with a cover sterilizing zone or section 7. All these inter-communicating sections are enclosed but the inter-communication between them is through valveless openings so that the entire interior of the apparatus is at substantially atmospheric pressure. Preferably, the containers are preheated before they are introduced into the sterilzer 3 in order to prepare the containers for sterilization, and thereby shorten somewhat the time of the sterilization treatment; and before preheating the containers, they are preferably washed and dried. For these purposes, a container washer 8 is provided which leads to a container drier 9, in turn connected to a container preheater 11. The containers are conducted in upright position through the apparatus by any suitable conveying mechanism, in a continuous line or path as is indicated by the dotted lines in Fig. 1; and after the lids or covers have been sealed onto the containers by the closing machine, the sealed containers are discharged through discharge opening 12 which is unsealed to the atmosphere.

In order to maintain sterile conditions in the entire apparatus and at the same time provide for sterilization of the containers and the container covers, a scavenging gas such as steam is introduced at various points in the system. This flow of steam prevents inflow of outside air through the entrance and exit openings of the system and also any other openings which may exist. Sterilization of the containers and their covers is a function of both time and temperature; and if the steam were ordinary saturated steam introduced into the system directly from the boiler, without being superheated, it would not have a sufficiently high temperature to effect sterilization of the containers and the covers within a short enough time period for rendering the system practical. This is overcome, however, by the means which is employed to superheat the steam to an adequate temperature above 212° F. at atmospheric pressure so as to effect the sterilization within a practical time limit. By super-heating the steam, additional heat or energy is applied thereto besides that resulting from the heat of vaporization imparted thereto by virtue of its generation.

In the aforementioned copending application, the embodiment of the invention illustrated in the drawings employs a super-heater for the steam which is directly associated with the can sterilizer section of the apparatus, but such application discloses that any suitable super-heater may be employed for super-heating the steam after it is generated in the boiler. In Fig. 1, such type of auxiliary heating means or super-heater 13 which may utilize any suitable heating means for super-heating the steam, such as gas or electrical means, is connected to the steam generator or boiler 14 by steam piping 16 in which is connected a suitable pressure reducing valve 17.

The super-heated steam is introduced into the container sterilizer 3 by piping 18, into the product filling section 4 by piping 19 and into the cover sterilizer 7 by piping 21. The valve 17 reduces the pressure of the steam from that of boiler pressure to a pressure not excessively above atmospheric pressure and preferably so that the steam's nozzle pressure is sufficiently low to provide a pressure in the system directly after introduction of the steam into the system of just slightly above atmospheric pressure, for example, a few hundredths of a pound. This provides a steady flow of steam from all openings in the container sterilized and in the remainder of the apparatus, so as to insure that the apparatus is maintained full at all times with flowing steam as it escapes through the openings and prevents the entrance of outside bacteria laden air into the apparatus. However, the steam can be introduced into the apparatus at a nozzle pressure of substantially atmospheric pressure because the injection velocity thereof will provide the necessary factor in keeping the air out by the flowing steam. Ejection of the super-heated steam into the apparatus at nozzle pressures excessively higher than atmospheric pressure is undesirable because this might cause the containers to be blown over as they are conveyed through the apparatus.

As previously explained, the sterilization of the containers and their covers is a function of both time and temperature; the higher the temperature, the lesser the time required to insure sterilization of the containers and their covers against all bacteria. However, it is desirable that the containers and their covers travel through the container sterilizer and the cover sterilizer as fast as is practically possible to provide for minimum length of the apparatus, and yet enable sufficiently rapid sterilization of these parts for economy of operation and output capacity. Under most conditions, a temperature of about 350° F. to 500° F. will effect thorough sterilization of the containers in the container sterilizer when the time of travel of the containers therethrough is about 30 seconds to 1 minute. Hence, the super-heater heats the steam so that it will have this temperature. The same is true for the cover sterilizer.

Any suitable sterilizing effect can be obtained by adjustment of the rate of travel of the containers in accordance with the particular steam temperature above 212° F. in the system. In order that the sterilization of the containers and their covers may be effected within a practical time limit for commercial operations, the steam should be super-heated so that it will have a temperature of at least 325° F. at atmospheric pressure and thus maintain the container sterilizer and the cover sterilizer sections at this temperature or above. The maximum temperature of the steam is not particularly critical, except insofar as it may have detrimental effects in the containers and their covers should the temperature be too high.

The product to be packed in the containers must be sterile when it is introduced into the containers. For effecting such sterilization, a so-called "flash sterilization" system, which is well known in the art for the sterilization of fluid products, is employed which enables the product to be rapidly sterilized. Such system is illustrated schematically in Fig. 1 and includes a heater 22 which is maintained at such high temperature as to sterilize the product rapidly; the heater being connected to a product supply tank 23 by piping 24. A 3-way valve 26 is connected in piping 24 and to a water inlet line 27 for a purpose to be subsequently explained. Also, connected in line 24 is a so-called constant volumetric discharge pump 28 which provides means for supplying a fixed predetermined quantity or volume of the product per unit of time; this quantity being regulatable at will by means of variable speed motor 29 connected to drive the pump.

Heater 22 is connected to a so-called holder 31 where the temperature is maintained for a sufficient length of time to complete the sterilization; and holder 31 is connected to a cooler 32 wherein the sterilized product is chilled or cooled. The cooled sterile product is conducted from cooler 32 by piping 33 connected in turn to the filler unit 34 mounted on top of the product filling section 4 and which supplies a continuous stream of the product into the containers; the construction and operation of which will be described hereinafter in detail.

Connected to piping 33 is piping 36 for conducting super-heated steam to sterilize the filler in a manner which will also be described hereinafter; a hand operable valve 37 being provided in piping 36. Another hand operable valve 38 is provided in piping 33 above a lower branch thereof shown in Fig. 1; and a pressure relief valve 39 which, for example, is set to by-pass at a pressure of about 100 lbs. per square inch, is positioned to by-pass liquid from piping 33 through outlet piping 40 which is adapted to provide a hot sterilizing water outlet. Valve 39 is connected in piping 40 directly at the point where such piping communicates with piping 33; but in the schematic drawing of Fig. 1, the valve is shown spaced from this point for clarity of illustration. The piping and valve arrangements are for the purpose of permitting thorough sterilization of the filler unit 34 when the apparatus is set in operation, and will be described more fully hereinafter.

From the preceding, it is seen that a continuous line of containers is conveyed continuously with a substantially uninterrupted motion through the product filling section 4 having mounted on the top thereof the filler unit 34. Such product filling section is connected between the container sterilizer 3 and the closing machine 6. Reference is now made to Figs. 3, 4, 5a, 5b and 5c for a more detailed description of the product filling section.

The product filling section, as well as the remainder of the apparatus, is provided with insulated walls 41 (not shown in Figs. 3 and 4). At its left end with reference to Fig. 5a, the enclosure which forms the product filling zone or section 4 is connected at 42 to the container sterilizer discharge passage 43; the containers 44 (shown in phantom lines) being conducted through the container sterilizer by means of a continuously moving cable 46 upon which the containers are supported and which passes about wheel 47 which is shown broken in Fig. 5a to conserve space. Substantially at the point where conveying cable 46 makes its turn, suitable swinging guides 48, well known in can transferring mechanism, are provided to effect transfer of the containers 44 from cable 46 onto a continuously running endless conveyor chain 49. In this connection, it will be noted that the arrangement of the guides 48 is such as to enable the containers to be shunted away from conveyor chain 49, in case it is desired to by-pass the product filling zone should emergency conditions arise during operation necessitating this by-pass.

Chain 49 has its upper reach supported on a suitable guide rail 51, and passes over sprocket 52 at one end; the sprocket being mounted on a shaft 53 positioned in conventional adjustable bearings 54. At its opposite end, endless chain 49 passes over a sprocket 56 positioned under a rotatable star wheel 57. The continuously moving chain 49 carries the containers onto a supporting plate 58 extending to the left of star wheel 57; and when the containers become engaged in pockets 57' of the star wheel, they are conducted by the star wheel along plate 58 to continuously running endless conveying mechanism 59; an arcuate guide 61 being provided between conveying mechanism 59 and conveyor chain 49 to guide the containers in the proper direction as they are transferred by star wheel 57.

The size and spacing of pockets 57' of the star wheel are such as to position the containers substantially contiguously with their flanges 44' in overlapping relationship, as is shown more clearly in Fig. 6. In this connection, a set of star wheels is provided having the proper pocket sizes and spacing therebetween for the varying standard size containers; and the star wheel is removably mounted to enable ready replacement in accordance with the container size being handled. Star wheel 57, thus, provides timing means associated with conveying mechanism 59 to position the containers thereon in a predetermined relationship adapted for most efficient filling.

Conveying mechanism 59 comprises a pair of laterally spaced endless chains, the upper reaches of which are supported on rails 60, and which are moved with a smooth substantially uninterrupted or continuous motion. They support the containers for movement between suitable vertically and laterally adjustable guide rails 62 positioned at the sides of conveyor 59 and along associated conveying mechanism to be described, to accommodate various heights and widths of containers; the left ends of the endless chains with reference to Fig. 5a passing over sprockets 63 accommodated in recesses 64 formed in supporting plate 58.

Filler unit 34 is positioned directly over conveying mechanism 59 as can be seen best from Figs. 6 and 7; and as the containers are conducted past the filler which discharges a continuous stream of sterile product, the containers become filled. The conveying mechanism 59 is continuously moved at such speed with reference to the filler as to cause each container to become substantially completely filled in its travel past the filler. With can type containers, since the containers are positioned upright on the conveying mechanism with their flanges adjacent their open mouths in overlapping relationship, there is substantially no spillage of the product. In this connection, as will be pointed out more fully hereinafter in the description of the filler per se, the discharge spout thereof is so designed as to discharge an elongated sheet or stream of the product.

From the filler conveyor 59, the containers are fed to the closing machine 6 in a predetermined relationship adapted for the particular type of closing machine which may be employed in the apparatus; and timing means is associated with the discharge end of conveyor 59 for spacing the containers apart in a predetermined relationship for feeding thereof to the closing machine. Such type of mechanism is well known and comprises an accelerating endless chain conveyor 66 having its upper reach supported on rail 67, and passing around a sprocket 68 positioned between right hand sprockets 69 for the chains of conveying mechanism 59; the sprockets 68 and 69 being mounted on suitable shafting 71.

Conveyor 66 moves at a faster speed than conveyor 59 to effect separation or spacing apart of the containers; the actual fixing of the spacing being effected by a rotating worm cylinder 72 having a worm 73, the pitch or lead of which increases to the proper extent from adjacent the discharge end of the conveying mechanism 59 to the discharge end of the worm. As is well known in mechanism of this type, the worm 73 effects the actual predetermined spacing between the containers while the accelerating chain 66 causes the containers to be held against the flights of worm 73 to fix such spacing.

Adjacent the discharge end of the worm 73 is another endless conveyor 74, the upper reach of which is supported on rail 76, and which has upwardly projecting properly spaced apart lugs 77 (Figs. 5b, 5c, 11 and 12) for engaging the containers and moving them in predetermined spaced apart relationship. In this connection, the worm 73 is timed with the lugs 77 on conveyor 74, as is well known in this type of mechanism, to effect smooth transfer of the containers to chain conveyor 74. Conveyor chain 74 engages sprocket 78 at its left end and overlaps the discharge end of conveyor chain 66 to provide for ready transfer of containers between these chains, the discharge end of chain 66 passing over sprocket 79. The right hand end of chain 74 passes over sprocket 81. Rail support 82 is provided adjacent conveyor 74 to support the containers as they are carried along by engagement with the lugs 77 on conveyor 74. Lugs 77 are provided on conveyor 74 to insure that the containers will be conducted to the closing machine in proper spaced relationship, without slippage.

After the containers leave conveyor 74 they are supported on spaced plates 83 providing a groove 83' therebetween, and are carried along by endless chain conveyor mechanism 86 having laterally extending lugs 87 engaging the containers; the lugs 87 having downwardly extending prongs 87' guided in groove 83'. Conveyor mechanism 86 forms the conveyor for the can closing machine and conducts the containers into the can closing machine not shown except schematically in Fig. 1. The left end of conveyor mechanism 86 engages sprocket 88.

With reference to Fig. 11, it will be noted that the worm cylinder 72 is journalled for rotation in a pair of spaced brackets 91, the left hand one of which is pivoted on a pivot pin 92, and the right hand one of which is pivoted in a bracket 95 formed of two angles secured together by cap screws 95', for rotation about shaft 93 of bevel drive gear 94. The brackets 91 are fixedly spaced apart at their upper ends by tie rod 96 detachably secured to the brackets. Shaft 93 carries a pinion 97 meshing with an idler gear 98 in turn meshing with a gear 99 fixedly secured for rotation with worm cylinder 72 so that the latter may be rotated about its axis.

By the described mounting of the worm cylinder, it will be noted that it can be laterally adjusted to position it properly in accordance with the diameter of the containers, and can be secured in adjusted position by clamping rod 96 to spaced clamping plates 100; the clamping plates having arcuate slots 100' in which the rod can move. At the same time a drive can be transmitted to the worm in any adjusted position thereof. It is to be understood that a different pitch or lead worm is required for each different size container; and a removable mounting of the worm cylinder is provided to enable ready interchangeability so that the proper worm may be employed, as is well known with this type of mechanism. Such removable mounting comprises a shaft 101 upon which worm cylinder 72 is removably fixed by set screws 101'; shaft 101 being removable endwise from the left bracket 91 upon loosening of the set screws.

The entire drive for the mechanism can be supplied from any suitable source of power. Since the can closing machine is driven, the drive may be taken off therefrom at any suitable location. The drive for bevel gear 94 for turning the worm is through bevel gear 102 meshing with gear 94, and which is mounted on shaft 103.

With reference to Fig. 3, and also Fig. 4 which illustrates the driving connections in phantom lines, it will be noted that the drive to star wheel 57 is through shafting 104 connected to suitable speed reducing mechanism in box 106. The drive to the filler conveyor 59 is ultimately through chain drive 107 connected to a sprocket housed in box 108 (Fig. 4); the driving of conveyor 49 being taken from conveyor 59 through shaft 108'. Accelerator conveyor 66 and worm cylinder 72 are driven from sprocket 109 connected to chain 109'; and the drive to lug conveyor 74 is through chain drive 110 connected to sprocket 110'. The can closing machine lug conveyor 86 is driven from the can closing machine itself. The particular form of the driving mechanism forms no part of the instant invention as any suitable driving means can be employed, as is well known in container transferring and conveying mechanism of the type embodied in this invention. Hence, it is unnecessary to describe the same in further detail.

Reference is now made to Figs. 6 through 10 for a description of a preferred type of filler embodied in the filling section 4 of the apparatus. As was previously mentioned, the filling section as well as the remainder of the apparatus are provided with insulated walls 41 so as to maintain heat therein. Perforated steam distributing piping 111 extends along the inside of the apparatus for the introduction of the superheated steam therein, and is supported on suitable brackets 112. The bottom of the filler section is provided with a sump portion 113 to gather any of the product which may spill or overflow from the containers as they are being filled; and as such product collects in sump 113 it flows out through goose neck trap 114 in which a level of the product is maintained, thereby forming a seal and preventing entrance of air borne bacteria through the trap. A vent 116 is provided adjacent the trap to prevent siphoning. Such drainage product may be collected and can be conducted back to the product supply tank 23 shown in Fig. 1.

The filler is in the form of an elongated casing 117 formed of parts detachably clamped together. One of these parts is a substantially semi-cylindrical reservoir 118 having at its lower end a flange 119 secured thereto and which is provided with a flat machined under-face. A groove 121 is formed in such machined face of the flange, which substantially completely encircles the casing; the end portions of the groove being closed and close together as can be seen best from Fig. 9 and being connected to pipes 122 for a purpose which will be described. The other part of the casing comprises a base plate 123 having a flat machined upper face to which flange 119 is detachably clamped by means of clamping lugs 124 engaging flange 119 and a spacer plate 126 extending along each side of base plate 123. Screws 127 extending through clamping lugs 124 and screwed into base plate 123 provide attaching means for effecting the clamping. The described arrangement permits the parts to be readily detached for cleaning when this is desired; and when the parts are clamped together a good seal obtains therebetween because of the flat machining of the cooperating faces on flange 119 and plate 123.

Secured to the underside of base plate 123 by any suitable means, such as welding, is an elongated discharge spout 128 extending the entire length of the filler and which has an elongated product discharge opening 129 therein. Because of the elongated character of the discharge opening, it will be noted with reference to Fig. 6 that it can span the mouths of the plurality of containers which are moved past the filler. Discharge opening 129 is formed with a longitudinally extending cylindrical passage 131 in which is slidably mounted a slide valve rod 132 which when adjusted longitudinally of the filler provides means for adjusting the cross sectional area of the discharge opening or spout; the reason for which will be explained hereinafter. A shroud 133 is preferably secured to base plate 123 and to the sides of spout 128 adjacent its discharge end, and insulating material 134 is preferably enclosed between the shroud and the base plate to maintain heat in the product filling zone, and preclude condensation of the superheated steam in the filler.

At the top, reservoir 118 is provided with a product inlet connecting tube 136 for introduction of the sterile product into the filler through the previously mentioned piping 33 which is detachably connected to tube 136 by a detachable coupling 137. If the product were allowed to flow directly from inlet tube 136 to the elongated discharge opening 129, it might not distribute itself uniformly over the length of such elongated discharge opening. Hence, baffle means is provided in filler reservoir 118 to cause the stream of product to have a smooth and even flow in the form of a sheet over the entire effective length of discharge opening 129 of the filler spout. Such baffle comprises a removably mounted elongated substantially cylindrical chamber 138 which is provided at its top with a product inlet tube 139 removably telescoped within inlet tube 136.

Baffle chamber 138 is of lesser diameter than the inside of the filler casing and is provided with substantially circular spacer and centering flanges 141 at its ends for positioning of the baffle so as to provide an annular passage 142 about the baffle. Also, the ends 143 of the baffle are spaced from the ends of filler reservoir 118 by means of spacing lugs 144. As can be seen more clearly from Figs. 6 and 7, a plurality of apertures 146 are provided along the entire length of the upper portion of the baffle chamber, to allow outflow of the product entering therein. Because of annular passage 142 and the described apertures 146, the product cannot have a direct flow to the filler spout but must flow out through the apertures 146 and around the outside of baffle 138. Consequently, it will be forced to flow out in a uniform sheet along the entire length of filler spout opening 129. Since baffle chamber 138 is removably mounted in the filler reservoir, it can be readily cleaned when desired after detachment of base plate 123 from the reservoir 118.

With reference to Figs. 6, 7 and 9, it will be noted that the filler is detachably mounted in the top or cover portion of the product filling zone enclosure portion 4; and this portion is vertically adjustable so as to enable the discharge end of the filler spout discharge opening 129 to be positioned close to the top of the containers to be filled as various size containers are run through the apparatus. In the remainder of the apparatus, such vertical adjustment of the top is not necessary because sufficient head space is provided to accommodate the highest commercial size containers which are generally utilized. In this connection, such head space is provided over the containers throughout the entire apparatus, thus obviating the possibility of the container tops striking the top of the enclosures and becoming damaged, knocked over, or jamming the conveyors.

The vertically adjustable portion includes insulated side walls 151, the lower ends of which are slidably mounted in recesses 152 in insulated shroud portion 153 fixedly secured to the side walls 154 of the enclosure. Screws 156 are provided in walls 154 and are adapted to screw into any one of a plurality of screw threaded apertures 157 vertically positioned in the inside sheets 158 of side walls 151. It is to be understood that the adjusting screws 156 and corresponding apertures 157 are provided at spaced points longitudinally of the filler section to fixedly secure the same when an adjustment is made. Access for effecting the adjustment is conveniently accomplished by a removable connection of insulated cover part 159 through hinge connection 161 which enables the cover 159 to be readily opened or closed. Cover 159 is provided with an elongated rectangularly shaped opening 162 for accommodating the entire filler casing 117. For this purpose, it will be noted from Figs. 6, 9 and 10 that the ends of the filler are provided with spaced ears 163 adapted to receive cap screws 164 for connection in the end walls of opening 162.

An upright handle 166 is secured to the right hand end of valve rod 132 appearing in Figs. 6 and 10 to provide a means for moving valve 132 longitudinally for adjustment of the cross sectional area of the filler spout discharge opening 129. To accommodate handle 166 and valve rod 132 for any adjusted position thereof, it will be noted from Figs. 6 and 9 that the portion of cover 159 adjacent the right hand end of the filler is provided with a relatively narrow elongated recess 167 to allow handle 166 to be moved to the right of the filler a distance substantially the length of the valve rod for full opening of the filler discharge opening 129. For holding handle 166 upright, it will be noted from Figs. 6 and 8 that a cross member 168 is provided adjacent the lower end of the handle, the ends of which are guided underneath guide rails 169, thus preventing turning of the handle.

*Filling operation.*—As was previously related, the described type of filler, although it has special applicability in the over-all general process wherein a sterile product is filled in sterile containers in a sterile atmosphere, the containers having been sterilized rapidly by superheated steam at atmospheric pressure, has general applicability for the continuous filling of any type of flowable or liquid product, besides food products. Since the containers are positioned on filler conveyor 59 with their flanges all in overlapping relationship, substantially no spilling will occur as the containers are moved past the filler spout or discharge opening because the product is directed by the filler in a very narrow stream or sheet over the overlapped portions of the container flanges. Because the containers are moved continuously past the filler with a substantially uninterrupted or steady motion, the contents of the containers will not spill after the containers have been filled which would otherwise be the case with respect to filling operations where the containers are moved with a marked intermittent motion in order to hold them stationary during the actual filling. In the latter method, inertia effects will cause the product to spill at each intermittent stage of the interrupted movement imparted to the containers.

A fixed quantity of product is discharged through the filler per unit of time by the constant volumetric discharge pump 28, and by moving the containers past the filler at a predetermined speed in accordance with the quantity or volume of the product discharged therefrom, each container will become substantially completely filled with the product as it passes by the filler. In this connection, when the apparatus is started up for any particular type of product, regulation may be readily obtained for obtaining the desired complete filling either by varying the speed of operation of the discharge pump through variable speed motor 29 or by adjusting the speed of the conveyor mechanism or both.

For any given regulation of the pump or equivalent product feeding means, a fixed quantity of the product will discharge from the filler per unit of time irrespective of the cross sectional area of the filler discharge opening 129 as regulated by valve rod 132. Such adjustment of the cross sectional area of the filler discharge opening has the sole effect of merely changing the velocity at which the product is discharged. Such regulation of the velocity of discharge of the product is important for the following reasons, and reference is made to schematic Figs. 2a, 2b and 2c for an explanation. Different types of product such as soups, milk products, oils, purees, etc. have varying viscosities; and the viscosity has a material effect on the piling up characteristics of the product as it enters the container. Fig. 2a illustrates a condition where the velocity of discharge for a relatively viscous product may be too low. It will be noted that the product piles up in the center of the container leaving a void around the circumference of the wall of the container. As a result of such piling up of the product it may project above the top of the containers and spillage may occur as the projecting product strikes the filler spout.

Figure 2B:
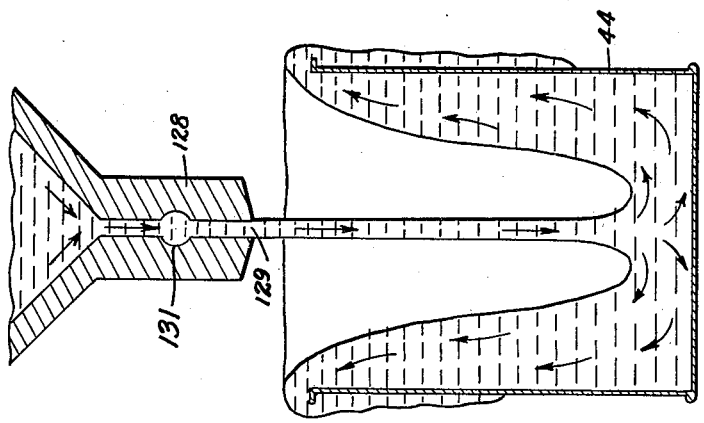
Figure 2A:
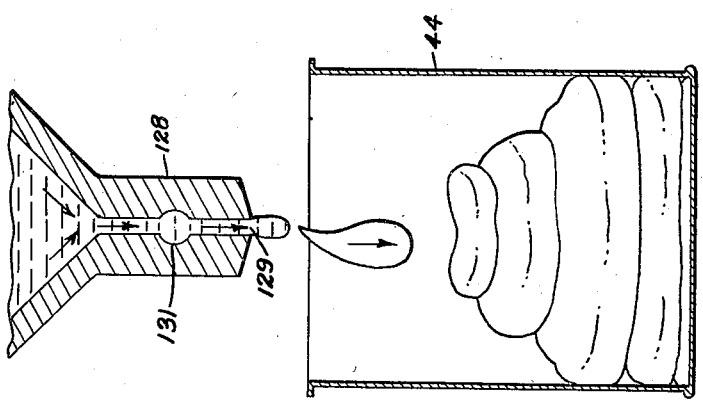
Figure 5A:
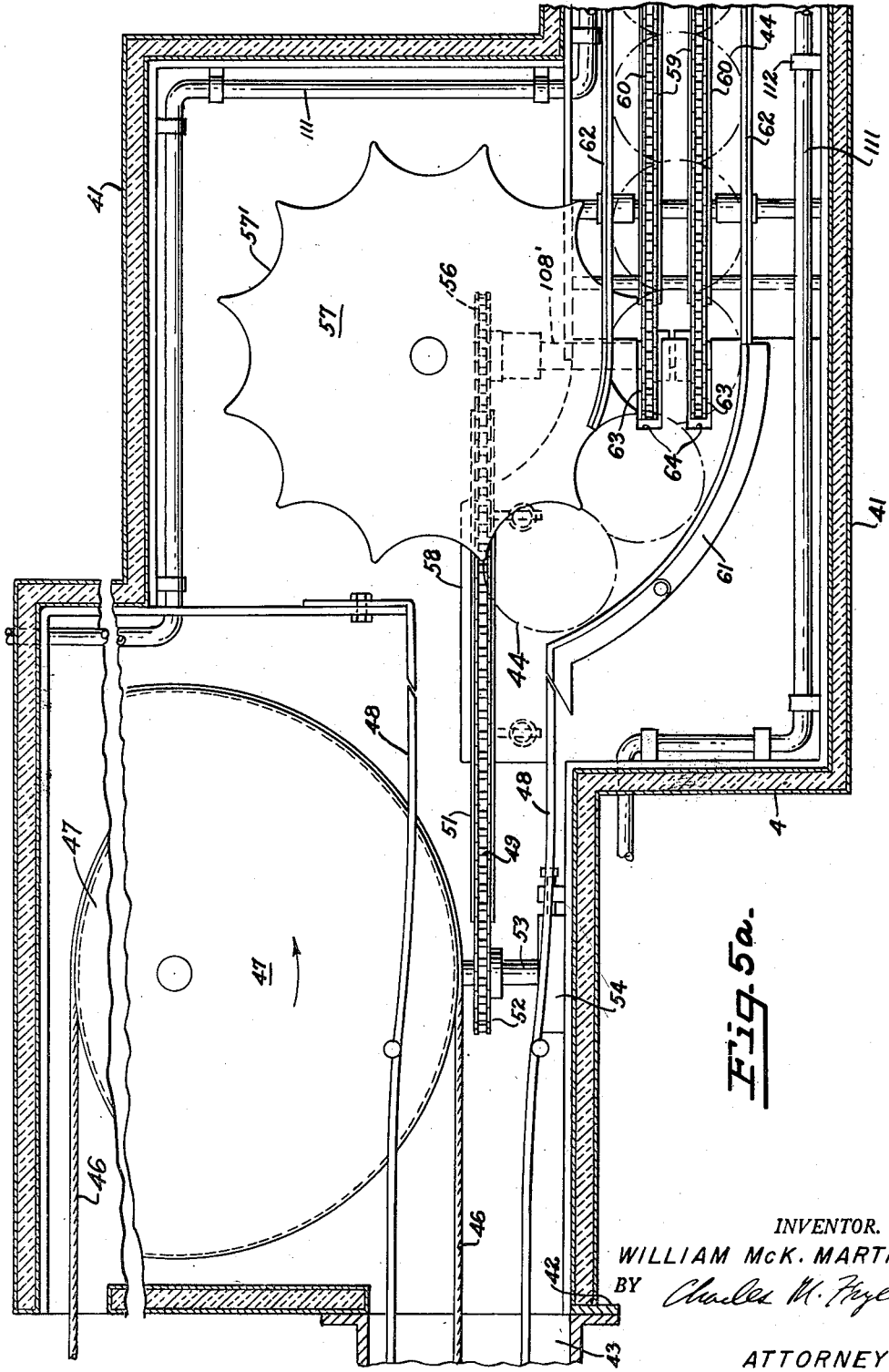

Fig. 2b illustrates a condition where the velocity of the discharge is too high. The momentum of the product leaving the discharge opening at such high velocity causes it to be deflected laterally and upwardly out of the container. In this instance, the behavior of the product is similar to that which can be observed when an empty drinking glass is held under a faucet and the water turned on quickly at too high a pressure.

Fig. 2c shows the condition of filling with a proper velocity of the product in relation to its viscosity or consistency in which the momentum of the product is just sufficient to prevent the piling up effect shown in Fig. 2a or the deflecting effect shown in Fig. 2b, to thus provide even filling of the product in each container. These variations in the piling up effect resulting from differences in viscosity or consistency of the product to be filled, can be overcome to produce the ideal effect illustrated in Fig. 2c by mere adjustment of velocity of the discharge of the product through adjustment of the cross sectional area of the filler discharge opening 129. In this connection, it will be recalled that since the containers are fed a constant volume of the product per unit of time, the container contents will always be the same for any given regulation irrespective of regulation of velocity of discharge of the product.

*Operation—aseptic processing system.*—In the canning of sterile food products which are rendered sterile by the previously described "flash sterilization" system, the containers themselves are sterilized, the container covers are sterilized and all other operations are conducted under sterile conditions at substantially atmospheric pressure by virtue of the auxiliary heating means which is provided to superheat the steam, namely, to impart additional heat thereto other than it would have at atmospheric pressure merely by virtue of the heat of vaporization resulting from generation of the steam in the boiler. By providing the superheating means, any suitable sterilizing temperature may be obtained depending upon the additional amount of heat imparted to the steam, so as to enable all of the operations to be conducted relatively fast. In this connection, it is to be noted that since the steam is injected into the system at a pressure not excessively above atmospheric pressure, there is no danger of knocking over containers which would otherwise result from injecting steam into the system at relatively high pressures.

In starting up the system for the aseptic process, it is desirable that the filler itself be sterile. Otherwise contamination of some of the containers might occur even though they and the product have been previously sterilized. Sterilization of the filler can be conveniently obtained by the following procedure. Before running the product through the system from product supply tank 23, hot sterilizing water under pressure may be run through, at a suitable temperature of, say, about 300° F. for about 10 minutes, by opening 3-way valve 26 to the sterilizing water inlet pipe 27 into which the sterilizing water is fed from any suitable source; having valve 37 closed, valve 38 open, and valve rod 132 of the filler open only a slight extent to allow flow of the sterilizing water through the filler but at the same time provide sufficient back pressure to maintain the water at the sterilizing temperature. In this connection, the usual cooling water supply to cooler 32 is shut off while the hot sterilizing water is run therethrough. The automatic by-pass valve 39, which is set to by-pass at a pressure of about 100 lbs. per sq. in., will allow discharge of the water from the system. With this circuit of operation, the system including the "flash sterilization" portion and the piping 33 up to the filler will become thoroughly sterilized.

By sterilizing the filler, particularly the portion below valve rod 132, valve 38 is closed and valve 37 is opened, while at the same time the circulation of the hot sterilizing water is continued to maintain the system ahead of valve 38 sterile. Also, valve rod 132 is opened to its fullest extent; and superheated steam which may be at any suitable temperature, preferably above 325° F. is introduced into piping 36 whereupon complete sterilization of the filler is effected.

When the filler is completely sterilized which may take a period of 5 or 10 minutes for precautionary measures, depending on the temperature of the superheated steam, valve 37 is closed and valve 38 is opened and the cooling water for cooler 32 is turned on; and the product is then supplied in place of the sterilizing water by manipulation of 3-way valve 26. For a short time water will be discharged but soon thereafter, the product sterilized in heater 22 will begin to flow from the filler.

*Sterile filler seal.*—To insure against possible contamination of the filler itself during operation of the system, a sterile seal is maintained between the detachable parts of which the filler is composed by introducing steam, which may be ordinary saturated boiler steam, into sealing groove 121 through one of pipes 122 connected at one end of the sealing groove. A valve 171 is connected in the other pipe 122 at the other end of the sealing groove and is maintained only slightly open when steam is first introduced into groove 121 to discharge steam condensate, thus insuring a sterilizing temperature corresponding to that of the steam boiler pressure.

Because sealing groove 121 substantially completely encircles the junction between the detachable parts of the filler, the steam heats such junction and adjacent parts to a sterilizing temperature. Since, as is shown more clearly from Fig. 9, the ends of the sealing groove are positioned closely together, the heat of the steam will sterilize the short portion of the junction which is not actually sealed by the steam. After maintaining the boiler steam in groove 121 at a sterilizing temperature for a suitable time of approximately 10 minutes, valve 171 is closed whereupon sterile steam condensate accumulates in the groove, thus maintaining a sterile pressure barrier at the junction between the detachable parts of the filler, whereupon the sterile product can be run through the filler.

The filling in the atmosphere of superheated steam which results in an atmosphere free of air also provides a decided advantage even though aseptic filling conditions may not be required, because in many products, even though sterile conditions may not be necessary, it is desirable to exclude atmospheric oxygen as it has a detrimental effect on the color, flavor and vitamins. Also, if air were present, it would become entrapped in the containers which frequently results in corrosion of tin plate containers; and with respect to glass containers corrosion of the caps may occur. In addition, in some lid sealing operations, the increased vacuum which occurs upon condensation of the steam in the product, is advantageous. Another important desirable factor in filling in an inert steam atmosphere is that by avoiding entrapment of air, voids are definitely obviated in the product. Any voids which may be formed by entrapment of steam will disappear upon condensation of the steam which will occur in a short time and result in collapse of the product over the voids after the containers have been sealed in the normal course of events. For these reasons, the filling in an air free atmosphere is desirable for any type of product even though aseptic conditions are not required.

I claim:

1. The method of continuously filling a pumpable product in containers of the type having outwardly extending flanges at their open mouths which comprises effecting continuous uninterrupted flow discharge of a bodily fixed stream of the product at a fixed zone, and at a predetermined fixed quantity per unit of time, moving a line of said containers toward said stream, prior to arrival of the containers at said stream overlapping the container flanges, and continuously moving the containers past said stream with their flanges thus overlapped and with a substantially uninterrupted motion at such speed relative to said stream as to cause the containers to be substantially uniformly filled in their travel past said stream.

2. The method of continuously filling a pumpable product in containers of the type having outwardly extending flanges at their open mouths which comprises effecting continuous uninterrupted flow discharge of a bodily fixed stream of the product at a fixed zone and at a predetermined fixed quantity per unit of time, moving a line of said containers toward said stream, prior to arrival of the containers at said stream overlapping the container flanges, continuously moving the containers past said stream with their flanges thus overlapped and with a substantially uninterrupted motion at such speed relative to said stream as to cause the containers to be substantially uniformly filled in their travel past said stream, and fixing the velocity flow of said stream by the cross sectional area of said stream to effect even filling of the product in said containers.

3. The method of claim 2 in which the product is a sterile food product and the filling of the containers is effected in an enclosed zone unsealed to the atmosphere whereby said zone is at substantially atmospheric pressure, and a substantially sterile atmosphere is maintained in said zone.

4. Apparatus for continuously filling a pumpable product in containers of the type having outwardly extending flanges at their open mouths which comprises means for effecting continuous uninterrupted flow discharge of a bodily fixed stream of the product from a discharge opening at a fixed station, said means including a substantially constant volumetric discharge pump for feeding a predetermined fixed quantity of the product per unit of time, means for continuously moving a line of said containers toward said stream, means for overlapping the container flanges prior to arrival of the containers at said stream and while the adjacent containers having their flanges overlapped are in motion, and means for continuously moving the containers past said stream with their flanges thus overlapped and with a substantially uninterrupted motion at such speed relative to said stream as to cause the containers to be substantially uniformly filled in their travel past said stream.

5. Apparatus for continuously filling a pumpable product in containers of the type having outwardly extending flanges at their open mouths which comprises means for effecting continuous uninterrupted flow discharge of a bodily fixed stream of the product from a discharge opening at a fixed station, said means including a substantially constant volumetric discharge pump for feeding a predetermined fixed quantity of the product per unit of time, means for continuously moving a line of said containers toward said stream, means for overlapping the container flanges prior to arrival of the container at said stream and while the adjacent containers having their flanges overlapped are in motion, and means for continuously moving the containers past said stream with their flanges thus overlapped and with a substantially uninterrupted motion at such speed relative to said stream as to cause the containers to be substantially uniformly filled in their travel past said stream, and means for fixing the velocity flow of said stream by the cross sectional area of said opening to effect even filling of the product in said containers.

WILLIAM McK. MARTIN.

References Cited in the file of this patent

UNITED STATES PATENTS

| Number | Name | Date |
|---|---|---|
| 14,703 | Risher | Apr. 15, 1856 |
| 22,339 | Badger | Dec. 21, 1858 |
| 241,924 | Buswell | May 24, 1881 |
| 442,766 | Brennan | Dec. 16, 1890 |
| 625,596 | Payne | May 23, 1899 |
| 1,075,534 | Ash | Oct. 14, 1913 |
| 1,260,636 | Campbell et al. | Mar. 26, 1918 |
| 1,270,798 | Dunkley | July 2, 1918 |
| 1,346,613 | Taliaferro et al. | July 13, 1920 |
| 1,420,222 | Schmidt | June 20, 1922 |
| 1,770,380 | Young | July 15, 1930 |
| 1,894,867 | Hoffman | Jan. 17, 1933 |
| 1,896,210 | Vogt | Feb. 7, 1933 |
| 1,919,155 | Ayars | July 18, 1933 |
| 1,959,937 | Thatcher | May 22, 1934 |
| 2,188,306 | Murch | Jan. 30, 1940 |
| 2,209,315 | Ball | July 30, 1940 |
| 2,315,932 | Burt et al. | Apr. 6, 1943 |
| 2,340,637 | Bauer | Feb. 1, 1944 |
| 2,380,984 | Moeller | Aug. 7, 1945 |
| 2,439,773 | Hohl et al. | Apr. 13, 1948 |
| 2,441,774 | Shaw et al. | May 18, 1948 |
| 2,486,200 | O'Connor | Oct. 25, 1949 |
| 2,549,216 | Martin | Apr. 17, 1951 |